US008229750B2

(12) United States Patent
Creamer et al.

(10) Patent No.: US 8,229,750 B2
(45) Date of Patent: *Jul. 24, 2012

(54) BARGE-IN CAPABILITIES OF A VOICE BROWSER

(75) Inventors: Thomas E. Creamer, Boca Raton, FL (US); Victor S. Moore, Boynton Beach, FL (US); Wendi L. Nusbickel, Boca Raton, FL (US); Ricardo Dos Santos, Boca Raton, FL (US); James J. Sliwa, Raleigh, NC (US)

(73) Assignee: Nuance Communications, Inc., Burlington, MA (US)

( * ) Notice: Subject to any disclaimer, the term of this patent is extended or adjusted under 35 U.S.C. 154(b) by 1953 days.

This patent is subject to a terminal disclaimer.

(21) Appl. No.: 10/833,518

(22) Filed: Apr. 28, 2004

(65) Prior Publication Data

US 2005/0246173 A1    Nov. 3, 2005

(51) Int. Cl.
*G10L 21/00* (2006.01)
(52) U.S. Cl. ..................................... 704/270; 704/270.1
(58) Field of Classification Search .................. 704/270, 704/270.1
See application file for complete search history.

(56) References Cited

U.S. PATENT DOCUMENTS

| | | | |
|---|---|---|---|
| 6,125,175 A | 9/2000 | Goldberg et al. | |
| 6,330,306 B1 | 12/2001 | Brown | |
| 6,370,254 B1 | 4/2002 | Gore et al. | |
| 6,574,595 B1 | 6/2003 | Mitchell et al. | |
| 6,801,604 B2 | 10/2004 | Maes et al. | |
| 6,947,895 B1* | 9/2005 | Shanmugham | 704/270 |
| 7,103,156 B2 | 9/2006 | Celi et al. | |
| 7,184,534 B2 | 2/2007 | Birch et al. | |
| 7,212,623 B2 | 5/2007 | Creamer et | |
| 7,424,432 B2 | 9/2008 | Creamer et al. | |
| 2001/0043684 A1 | 11/2001 | Guedalia et al. | |
| 2002/0103554 A1 | 8/2002 | Coles et al. | |
| 2002/0173333 A1 | 11/2002 | Buchholz et al. | |
| 2002/0184373 A1* | 12/2002 | Maes | 709/228 |
| 2004/0230434 A1* | 11/2004 | Galanes et al. | 704/270.1 |
| 2005/0261907 A1* | 11/2005 | Smolenski et al. | 704/270 |
| 2009/0055191 A1 | 2/2009 | Creamer et al. | |

* cited by examiner

*Primary Examiner* — Angela A Armstrong
(74) *Attorney, Agent, or Firm* — Wolf, Greenfield & Sacks, P.C.

(57) ABSTRACT

A method for barging-in a call can include the step of establishing a component as a communication intermediary between at least one speech engine and a telephone gateway. The component can include at least one input media port and at least one output media port, where the input media port and the output media port can interface with selective ones of the speech engines. A barge-in command can be received while an automated prompt is being audibly presented. The signals for the prompt can be conveyed to the component via the output media port. Once the barge-in command has been received, the output media port can be closed to immediately stop the prompt from being presented. A halt command can be conveyed to a prompt generating source so that the source stops generating the prompt.

22 Claims, 2 Drawing Sheets

BARGE-IN CAPABILITIES OF A VOICE BROWSER

BACKGROUND

1. Field of the Invention

The present invention relates to the field of telecommunications and, more particularly, to a telecommunications voice server with improved barge-in capabilities.

2. Description of the Related Art

Interactive Voice Response (IVR) systems can be used to form a telephone-based link between users and computer systems. The computer systems can include one or more communicatively linked voice servers, which provide a multitude of speech services, like automatic speech recognition (ASR) services, synthetic speech generation services, transcription services, language and idiom translation services, and the like. IVR technologies permit users to provide speech input and/or provide Dual Tone Multiple Frequency (DTMF) input to automated systems. The automated system can interpret the user input and can responsively perform one or more programmatic actions. These programmatic actions can include producing synthetic speech output and presenting this output to the user via a telephone handset.

Commonly, a user will respond to a voice prompt before the entire voice prompt has been presented. For example, the voice prompt can provide a listing of options and the user can select one of these options as others are still being presented, thereby interrupting the audio prompt. The interruption of an audio prompt that is presented by an automated system can be referred to as barge-in.

When barge-in techniques operate too slowly, a user can continue to hear the prompt after providing the barge-in command, which is undesirable. In a particularly undesirable situation, an impatient user may believe input was not received by the automated system and rapidly repeat the barge-in command. The receipt of multiple barge-in commands can further slow down system processing and/or can result in problematic side effects, such as the inadvertent selection of a menu option.

One conventional solution designed to improve barge-in response time, closely couples ASR and text-to-speech (TTS) systems together within voice server software. The close coupling of these components can permit a voice server to halt TTS generated audible prompts immediately upon determining that a speech input is a barge-in command. That is, the voice server can be optimized for barge-in by explicitly designing optimized exceptions for barge-in within source code at a low-level. Such a solution, however, jeopardizes functional isolation of components and violates many generally accepted preferred software practices. Further, such a solution can prevent a voice server component of an IVR system from using remotely located, independently developed TTS and ASR engines. There exists a need for a technique that permits a voice server to perform rapid barge-in operations that does not negatively affect the architectural integrity of the voice server.

SUMMARY OF THE INVENTION

The present invention includes a method, a system, and an apparatus for barging in an audio prompt, such as an IVR prompt, in accordance with the inventive arrangements disclosed herein. More specifically, a telephone and media (T&M) subsystem, such as a media serving component, of a componentized voice server can have socket serving capabilities. Different sockets with different functional responsibilities can be established for approximately the duration of a telephone call. For each call, an input channel, an output channel, and a control channel can be established. The input channel can convey signals from a telephone gateway to a designated speech engine. The output channel can convey signals from a designated speech engine to the telephone gateway. The control channel can convey commands and other control signals between the media serving component and one or more speech engines. When the barge-in command is conveyed to the media serving component, the media serving component can immediately close the output channel, thereby stopping any audio prompts from being presented to a user.

One aspect of the present invention can include a method for barging-in an audio prompt during a call. The method can include the step of establishing a component as a communication intermediary between at least one speech engine and a telephone gateway. The component can include at least one input media port and at least one output media port, where the input media port and the output media port can interface with selective ones of the speech engines. A barge-in command can be received while an automated prompt is being audibly presented. The signals for the prompt can be conveyed to the component via the output media port. Once the barge-in command has been received, the output media port can be closed to immediately stop the prompt from being presented. A halt command can be conveyed to a prompt generating source so that the source stops generating the prompt.

It should be noted that the invention can be implemented as a program for controlling a computer to implement the functions described herein, or a program for enabling a computer to perform the process corresponding to the steps disclosed herein. This program may be provided by storing the program in a magnetic disk, an optical disk, a semiconductor memory, any other recording medium, or distributed via a network.

Another aspect of the present invention can include a system with rapid call barge-in facilities that includes a telephone gateway, one or more speech engines, and a voice server. The voice server can have a componentized architecture of different modular components. One of the components can be a media converting component that can be configured as a communication intermediary between the speech engines and the telephone gateway. The media converting component can include one or more input media ports, one or more output media ports, and/or a control port. The control port can convey control signals between each of the speech engines and the media converting component. The media converting component can be configured to close the output media port responsive to receiving a barge-in command.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1A:
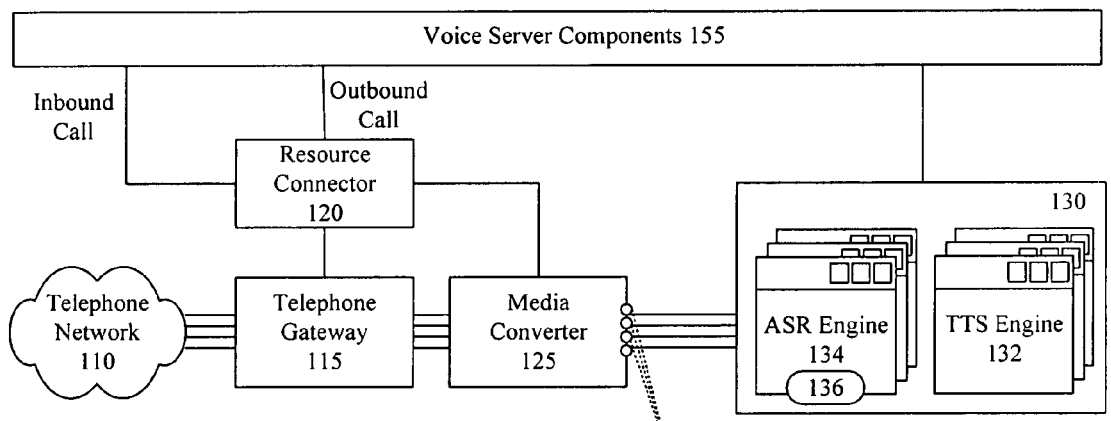
FIG. 1A is a schematic diagram illustrating a system that provides speech services, wherein the system has rapid barge-in capabilities in accordance with the inventive arrangements disclosed herein.

FIG. 1A is a schematic diagram illustrating a system 100 that provides speech services. The system 100 can have rapid barge-in capabilities in accordance with the inventive arrangements disclosed herein. The system 100 can include a telephone gateway 115, a componentized voice server having a multitude of voice server components 155, and a multitude of speech engines 130.

The telephone gateway 115 can include hardware and/or software that translates protocols and/or routes calls between a telephone network 110, such as a Public Switched Telephone Network (PSTN), and the voice server components 155. The telephone gateway 115 can route calls using packet-switched as well as circuit switched technologies. Further, the telephone gateway 115 can contain format converting components, data verification components, and the like. For example, the telephone gateway 115 can include a Cisco 2600 series router from Cisco Systems, Inc. of San Jose, Calif., a Cisco, a Cisco 5300 series gateway, a Digital Trunk eXtended Adapter (DTXA), a Intel (R) Dialogic (R) Adaptor from Intel Corporation of Santa Clara, Calif., and the like.

The speech engines 130 can include one or more automatic speech recognition engines 134, one or more text to speech engines 132, and other speech related engines and/or services. Particular ones of the speech engines 130 can include one or more application program interfaces (APIs) 136 for facilitating communications between the speech engine 130 and external components. For example, in one embodiment, the ASR engine 134 can include an IBM ASR engine with an API such as a Speech Manager API (SMAPI).

The voice server can have a componentized and isolated architecture that can include voice server components 155 and a media converter component 125. In one embodiment, the voice server can include a Websphere Application Server (WAS). The voice server components 155 can include a telephone server, a dialogue server, a speech server, one or more web servers, and other such components. Selective ones of the voice server components 155 can be components executing within Virtual Machines, such as virtual machines adhering to the JAVA 2 Enterprise Edition (J2EE) specification. In one embodiment, a call descriptor object (CDO) can be used to convey call data between the voice server components 155. For example, the CDO can specify the gateway identifiers, audio socket identifiers, telephone identification data, and/or the like.

The media converter 125 can perform media conversions between the telephone gateway 115 and the speech engines 130, between the voice server components 155 and the telephone gateway 115, and between the voice server components 155 and the speech engine 130. In one embodiment, the media converter 125 can be a centralized interfacing subsystem of the voice server for inputting and outputting data to and from the voice server components 155. For example, the media converter 125 can include a T&M subsystem, such as the T&M subsystem of a WAS.

The media converter 125 can establish a plurality of media ports 122, thereby functioning as an audio socket server. Each of the media ports 122 can be used to establish a communication link with a speech engine 130. Moreover, each of the media ports 122 can be associated with a telephone call. When a call is initialized, one or more media ports 122 can be established. The media ports 122 can remain active and available for approximately the duration of the call. Multiple different speech engines 130 that process different turns for a call can use the same media port 122 to relay information to and from the media converter 125.

The system 100 can also include a resource connector 120. The resource connector 120 can be a communication intermediary between the telephone gateway 115 and the voice server components 155 and/or media converter 125. The resource connector 120 can manage resource allocations for calls.

Figure 1B:
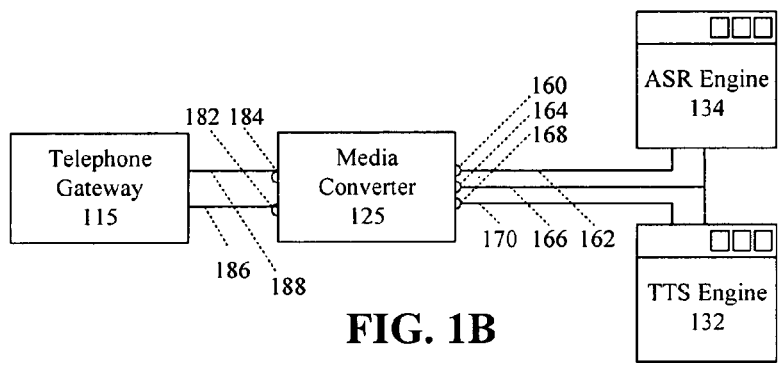
FIG. 1B is a schematic diagram illustrating one embodiment for communicatively linking particular speech engines and a media converter via call-based ports in accordance with the inventive arrangements disclosed herein.

FIG. 1B is a schematic diagram illustrating one embodiment for communicatively linking particular speech engines and a media converter via call-based ports in accordance with the inventive arrangements disclosed herein. In FIG. 1B, the media ports 122 can include at least one input port 160, at least one output port 168, and a control port 164. An ASR engine 134 can establish an input channel 162 with the media converter 125 via the input port 160. Speech input from callers can be conveyed through the telephone gateway 115 and through the media converter 125 to the ASR engine 134 via the input channel 162.

A TTS engine 132 can establish an output channel 170 with the media converter 125 via the output port 168. Speech output generated by the TTS engine 132 can be conveyed through an output channel 170 to the output port 168, where it can be further conveyed through the media converter 125, then to the telephone gateway 115, and ultimately be sent to telephone users.

A control channel 166 can be established between the ASR engine 134 and the media converter 125 via the control port 164 and between the TTS engine 132 and the media converter 125 via the same control port 164. Control signals, such as a barge-in command and/or a process halt command can be conveyed using the control channel 166. It should be noted that while a single control channel 166 can be utilized by multiple speech engines 130, multiple control channels 166 can also be established. In such an instance, each of the multiple control channels 166 can be communicatively linked to selective ones of the speech engines 130.

The media converter 125 can be linked to the telephone gateway 115 through input channel 188 via input port 184. The media converter 125 can also be linked to the telephone gateway 115 through output channel 186 via output port 182. Accordingly, input can be conveyed from the telephone gateway 115 via input channel 188 to the media converter 125, then from the media converter 125 to the ASR Engine 134 via input channel 162. Additionally, output can be conveyed from the TTS Engine 132 to the media converter 125 via output channel 170, then from the media converter 125 to the telephone gateway 115 via the output channel 186.

In operation, a user can initiate a telephone call. The call can be conveyed through the telephone network 110 and can be received by the telephone gateway 115. The telephone gateway 115, having performed any appropriate data conversions, can convey call information to the resource connector 120. For example, call information can be conveyed using session initiation protocol (SIP). In particular embodiments, the telephone gateway 115 can also convert circuit-switched data to packet-switched data for processing by the media converter 125 and the voice server components 155. In other embodiments, the resource connector 120 can convert circuit-switched data to packet-switched data as appropriate. The resource connector 120 can generate a CDO that contains call related information, including the port(s) that telephone gateway 115 has assigned to the call. In one embodiment, the CDO can be a Java object and the assigned port(s) can include Reliable Data Protocol (RDP) port(s).

Once generated, the CDO can be sent to the media converter 125 via the resource connector 120. The media converter 125 can then establish one or more media ports 122 that can be used for communications between the media converter 125 and speech engines 130 for the duration of the call. Identifiers, which can be Uniform Resource Identifiers (URI), associated with the established media ports 122 can be added to the CDO. In one embodiment, the media ports 122 can include the control port 164, at least one input port 160, and at least one output port 168, specifics of which have been previously detailed.

The CDO can be conveyed to voice server components 155 as appropriate for conducting the operations of the voice server. The voice server components 155 can determine that one or more work units need processing by a speech engine 130. Work units can be defined operations that are to be discretely processed, where turn-based voice servers can process one or more work units per turn. For each work unit, an appropriate speech engine 130 can be selected. The CDO can be conveyed to the selected speech engine 130.

The speech engine 130 can connect to the media converter 125 via the media port 122 identified within the CDO. The speech engine 130 can then be conveyed appropriate input signals via an input channel 162. The speech engine 130 can process the work unit and convey resulting audio signals back to the media converter 125 over the output channel 170. Control signals can be conveyed between the speech engine 130 and the media converter 125 via the control channel 166. After the speech engine 130 has handled the work unit, the connection with the media converter 125 can be terminated so that other speech engines 130 can utilize the available media port 122 for conveying data relating to other work units.

When a barge-in condition is detected at the same time an audio prompt is being presented, the media converter 125 can immediately halt the presentation of the audio prompt. In one embodiment, the audio presentation can be halted by closing the output port 182, thereby closing the output channel 186 between the media converter 125 and the telephone gateway 115. Closing output channel 186 can stop the presentation of all audio to a caller. In another embodiment, the audio presentation can be halted by closing the output port 168, thereby closing the output channel 170 between the media converter 125 and the TTS engine 132. Closing output channel 170 can stop the presentation of a prompt generated by the TTS Engine 132. That is, other audio signals from other audio sources can continue to be presented to a caller even though output channel 170 has been closed.

After the media converter 125 has halted the presentation of the audio prompt, a control signal can be conveyed to the prompt generating source via the control channel 166, so that the prompt generating process can be terminated. Any latency between identifying the barge-in condition and terminating the prompt generating process are not apparent to users, since the presentation of the audio prompt stops immediately upon closing the appropriate output port(s).

Figure 2:
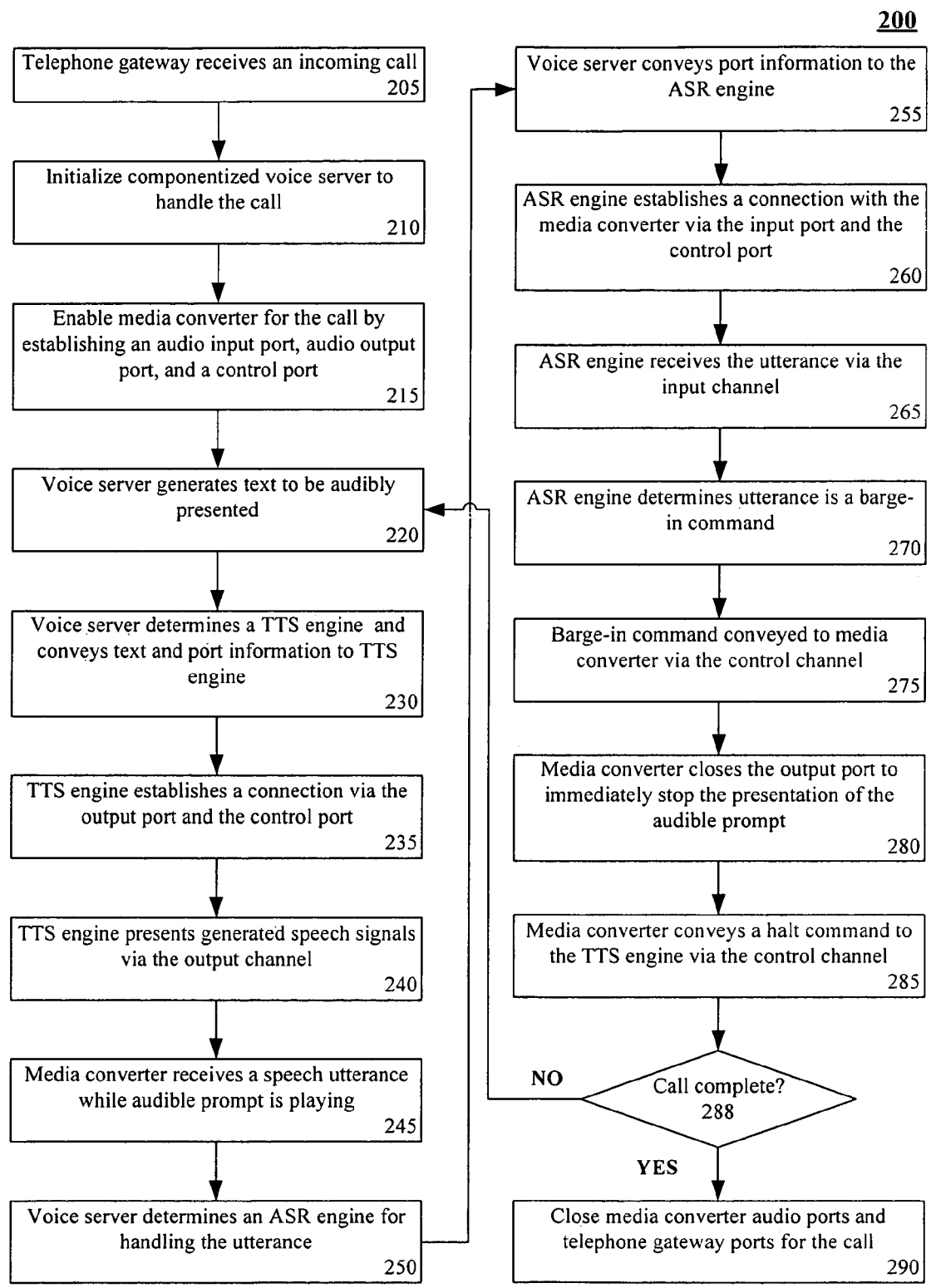
FIG. 2 is a flow chart of a method for improving the barge-in capabilities of a voice server in accordance with the inventive arrangements disclosed herein.

FIG. 2 is a flow chart of a method 200 for improving the barge-in capabilities of a voice server in accordance with the inventive arrangements disclosed herein. The method 200 can be performed in the context of a voice server having a telephony and multimedia subsystem that handles data exchanged between a voice server and external components, such as a telephone gateway and/or one or more speech engines. The method can begin in step 205, where a telephone gateway can receive an incoming call. In step 210, a componentized voice server can be initialized to handle the call. In step 215, a media converter, which is a component of the voice server, can establish one or more audio ports for the call. These audio ports can include an input port, an output port, and a control port.

According to one aspect of the present invention, the media converter can detect a barge-in condition via the input port while an audible prompt is being presented via the output port. For instance, speech utterances can be conveyed via the input port to an automated speech recognition (ASR) engine so that the ASR engine can determine whether the utterances represent the occurrence of a barge-in condition. It should be appreciated that a barge-in condition can be determined based upon any predetermined event or input and need not be based upon a text-to-speech converted speech utterance. For example, a barge-in condition can result from the receipt of an in-band, non-speech signal, such as a DTMF input.

In step 220 once the media converter has established the audio ports, the voice server can generate text for the telephone call to be audibly presented to a user via the telephone gateway. In step 230, the voice server can determine a text-to-speech (TTS) engine for converting the text into synthesized speech. The voice server can convey the generated text, call information, and media port information to the selected TTS engine.

In step 235, the TTS engine can establish a connection with the media converter via the previously established ports. One such communication connection can establish an output channel between the TTS engine and the media converter via the output port, where the output channel can be used to convey audible signals generated by the TTS engine. Another such communication connection can establish a control channel through which control signals can be conveyed. The output channel and the control channel can have different throughput characteristics.

In step 240, the TTS engine can present generated speech signals to the media converter via the output channel. The media converter can convey the generated speech signals to the telephone gateway to be presented to a telephone user as an audio prompt. It should be appreciated, however, that the TTS engine can present previously recorded audio including music and/or speech segments as an audio prompt. That is, the audio prompt presented to the telephone user by the TTS engine need not contain synthetic speech dynamically generated from text. Indeed, any audio prompt generated in any fashion can be provided via the output channel.

In step 245, the media converter can receive a speech utterance. The speech utterance can be received while the audio prompt is still being presented. In step 250, the voice server can determine an automatic speech recognition engine for handling the utterance. In step 255, the voice server can convey media converter port information to the selected ASR engine. In step 260, the ASR engine can establish connections with the media converter via the input port and the control port, where the communication link established with the input port can be referred to as an input channel and the communication link established with the control port can be referred to as a control channel. The control channel can be shared by multiple speech engines. For example, the TTS engine and the ASR engine can connect to the media converter via the same control port. In step 265, the ASR engine can receive the speech utterance via the input channel.

In step 270, the ASR engine can detect a barge in condition, such as user provided speech being received during text-to-speech playback. In step 275, a barge-in command signifying the detection of the barge-in condition can be conveyed to the media converter via the control channel. In step 280, the media converter can close the output port upon receiving the barge-in command. Closing the output port can immediately stop the presentation of the audio prompt. The closing of the audio port need not be a permanent closing, but may be a temporary data stopping action. That is, the actual socket can remain active. For example, the data received through the socket closed by the media converter can be diverted, discarded, and/or cached, instead of being relayed to the telephone gateway.

It should be noted that in step 280, that the barge-in command received by the media converter can be any indicator that a barge-in condition has occurred. That is, the barge-in command need not represent the actual command recognized by the ASR engine and can instead be any signal or indicator that triggers the media converter to halt the presentation of the prompt.

In step 285, the media converter can convey a halt data presentation command to the TTS engine via the control channel. The TTS engine can stop generating the audio prompt responsive to the halt command. It should be appreciated that closing the output port at the media converter results in the immediate halting of the audio prompt, even though the TTS engine may still be providing audio output to the media converter.

The method can proceed to step 288, where a determination can be made as to whether the call has been completed. If the call has not been completed, the method can loop to step 220 where the call can continue to be processed and the voice server can eventually generate another text message relating to an aspect of the call. If the call has been complete, the method can proceed to step 290, where the media converter can close the audio ports and the telephone gateway ports that are associated with the call.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented system with rapid call-barge-in facilities comprising:
    hardware and software configured to implement:
        a telephone gateway;
        at least one speech engine; and
        a voice server comprising hardware and having a plurality of modular components, wherein one component of the plurality of modular components is a media converting component configured as a communication intermediary between the telephone gateway and the at least one speech engine, wherein the media converting component comprises an output media port via which communications are sent from the at least one speech engine to the telephone gateway, and wherein the media converting component is configured to close the output media port responsive to detecting a barge-in condition.

2. The system of claim 1, wherein the at least one speech engine comprises a first speech engine, and wherein the system further comprises a second speech engine, and wherein the media converting component is configured as a communication intermediary between the telephone gateway and the first speech engine and between the telephone gateway and the second speech engine.

3. The system of claim 2, wherein the media converting component further comprises an input media port via which communications are sent from the telephone gateway to the second speech engine.

4. The system of claim 3, wherein the input media port and the output media port provide communication links for a same telephone call, and wherein the input media port and the output media port remain allocated to the telephone call for approximately a duration of the telephone call.

5. The system of claim 3, wherein the first speech engine comprises at least one text-to-speech engine configured to convey generated speech to the telephone gateway through the output media port, and wherein the second speech engine comprises at least one automatic speech recognition engine configured to receive speech utterances from the telephone gateway through the input media port during playback of speech generated by the at least one text-to-speech engine, wherein the at least one automatic speech recognition engine is configured to determine that particular speech utterances represent barge-in conditions.

6. The system of claim 3, wherein the media converting component further comprises a control port for conveying control signals between the first speech engine, the second speech engine, and the media converting component, one control signal being a halt command for ending a presentation of an audio prompt provided by one of the first and second speech engines.

7. A computer-implemented method for use in a system comprising a component configured as a communication intermediary between a telephone gateway and at least one speech engine, the component having an output media port via which communications are sent from the at least one speech engine to the telephone gateway, the method comprising:
    detecting a barge-in condition while an automated prompt is being audibly presented via the telephone gateway, wherein signals corresponding to the prompt are conveyed to the component via the output media port;
    closing, responsive to the detecting step, the output media port to immediately stop the prompt from being presented; and
    conveying a halt command to a prompt generating source to stop the prompt generating source from generating the prompt.

8. The method of claim 7, wherein the output media port remains closed until the audible presentation of the prompt has completed.

9. The method of claim 7, wherein the component is a media converting component.

10. The method of claim 7, wherein the at least one speech engine comprises a text-to-speech engine that conveys at least one of generated speech and prerecorded audio signals to the component via the output media port, the text-to-speech engine being the prompt generating source.

11. The method of claim 7, wherein the system further comprises an automatic speech recognition engine and wherein the component further has an input media port via which communications are sent from the telephone gateway to the automatic speech recognition engine, the method further comprising:
receiving a speech utterance from the telephone gateway;
conveying the speech utterance to the automatic speech recognition engine via the input media port;
converting the speech utterance to text; and
determining the barge-in condition from the text.

12. The method of claim 7, further comprising:
receiving an in-band, non-speech signal from the telephone gateway; and
interpreting the in-band, non-speech signal as the barge-in condition.

13. The method of claim 7, further comprising associating the output media port with a telephone call, wherein the output media port remains allocated to the telephone call for approximately a duration of the telephone call.

14. The method of claim 7, wherein the at least one speech engine comprises a first speech engine and wherein the system further comprises a second speech engine, the component having an input media port via which communications are sent from the telephone gateway to the second speech engine, wherein at least one of the input media port and the output media port is utilized by a plurality of different speech engines during a telephone call, each speech engine of the plurality of different speech engines processing a selected work unit relating to the telephone call, the work unit being determined by a voice server, the component being a subcomponent of the voice server.

15. The method of claim 7, wherein the component further comprises a control port, and wherein the method further comprises:
establishing a communication link between the component and the at least one speech engine via the control port; and
conveying control signals across the control port, wherein the halt command is one of the control signals.

16. A machine-readable storage having stored thereon a computer program having a plurality of code sections, the plurality of code sections executable by a machine to cause a system to perform a method, the system comprising a component configured as a communication intermediary between a telephone gateway and at least one speech engine, the component having an output media port via which communications are sent from the at least one speech engine to the telephone gateway, the method comprising:
detecting a barge-in condition while an automated prompt is being audibly presented via the telephone gateway, wherein signals corresponding to the prompt are conveyed to the component via the output media port;
closing, responsive to the detecting step, the output media port to immediately stop the prompt from being presented; and
conveying a halt command to a prompt generating source to stop the prompt generating source from generating the prompt, wherein the output media port remains closed until the audible presentation of the prompt has completed.

17. The machine-readable storage of claim 16, wherein the component is a media converting component.

18. The machine-readable storage of claim 16, wherein the at least one speech engine comprises a text-to-speech engine that conveys at least one of generated speech and prerecorded audio signals to the component via the output media port, the text-to-speech engine being the prompt generating source.

19. The machine-readable storage of claim 16, wherein the system further comprises an automatic speech recognition engine and wherein the component further has an input media port via which communications are sent from the telephone gateway to the automatic speech recognition engine, and wherein the method further comprises:
receiving a speech utterance from the telephone gateway;
conveying the speech utterance to the automatic speech recognition engine via the input media port;
converting the speech utterance to text; and
determining the barge-in condition from the text.

20. The machine-readable storage of claim 16, wherein the method further comprises:
receiving an in-band, non-speech signal from the telephone gateway; and
interpreting the in-band, non-speech signal as the barge-in condition.

21. The machine-readable storage of claim 16, wherein the method further comprises associating the output media port with a telephone call, wherein the output media port remains allocated for approximately a duration of the telephone call.

22. The machine-readable storage of claim 16, wherein the component further comprises a control port, and wherein the method further comprises:
establishing a communication link between the component and the at least one speech engine via the control port; and
conveying control signals across the control port, wherein the halt command is one of the control signals.

* * * * *